US007144026B2

(12) United States Patent
Kao

(10) Patent No.: US 7,144,026 B2
(45) Date of Patent: Dec. 5, 2006

(54) WHEEL CHAIR HAVING FOLDABLE BACK SUPPORT

(76) Inventor: Ching Chih Kao, No. 100, Suwang Road, Dali City, Taichung 412 (TW)

(*) Notice: Subject to any disclaimer, the term of this patent is extended or adjusted under 35 U.S.C. 154(b) by 179 days.

(21) Appl. No.: 10/989,831

(22) Filed: Nov. 16, 2004

(65) Prior Publication Data

US 2006/0232039 A1 Oct. 19, 2006

(51) Int. Cl.
*B62M 1/14* (2006.01)
*A61G 5/08* (2006.01)
*B62B 3/02* (2006.01)
*B62B 7/06* (2006.01)

(52) U.S. Cl. .............................. 280/250.1; 280/304.1; 280/647; 180/907

(58) Field of Classification Search ............ 280/304.1, 280/250.1, 647; 180/907
See application file for complete search history.

(56) References Cited

U.S. PATENT DOCUMENTS 2,476,769 A * 7/1949 Rideout ...................... 297/368
3,185,495 A * 5/1965 Pivacek ...................... 280/657
3,881,773 A * 5/1975 Rodaway ................. 280/250.1
4,339,013 A 7/1982 Weigt ......................... 180/6.5
4,389,070 A * 6/1983 Chien ......................... 297/365
4,655,471 A * 4/1987 Peek ........................ 280/250.1
4,968,051 A * 11/1990 Luo ........................ 380/304.1
5,050,899 A * 9/1991 Stensby ................... 280/250.1
5,137,295 A * 8/1992 Peek ........................ 280/304.1
5,195,803 A * 3/1993 Quintile ...................... 297/365
5,199,520 A 4/1993 Chen ......................... 180/65.5
5,292,144 A * 3/1994 Sosnoff ................... 280/304.1
5,294,141 A * 3/1994 Mentessi et al. ......... 280/250.1
5,560,636 A 10/1996 Chen .......................... 280/642
5,865,457 A * 2/1999 Knabusch et al. ....... 280/304.1
6,089,593 A * 7/2000 Hanson et al. .............. 280/650
6,120,041 A * 9/2000 Gehr et al. ................... 280/30
6,203,054 B1 * 3/2001 Matsumoto ................. 280/647
6,224,156 B1 * 5/2001 Fleigle .................... 297/354.1
6,276,704 B1 * 8/2001 Suiter ...................... 280/250.1
6,296,265 B1 * 10/2001 Lovins .................... 280/250.1
6,793,232 B1 * 9/2004 Wing ...................... 280/304.1
6,805,406 B1 * 10/2004 Jansen ........................ 297/328
6,866,288 B1 * 3/2005 Martin ....................... 280/647
6,902,178 B1 * 6/2005 Wing ...................... 280/304.1
2003/0042779 A1 * 3/2003 Yamasaki et al. ...... 297/362.13
2006/0113746 A1 * 6/2006 Bright et al. ............ 280/304.1

FOREIGN PATENT DOCUMENTS

JP 405305112 A * 11/1993 ............. 280/304.1

* cited by examiner

*Primary Examiner*—Lesley D. Morris
*Assistant Examiner*—Marc A. Scharich
(74) *Attorney, Agent, or Firm*—Charles E. Baxley

(57) ABSTRACT

A wheel chair includes a back support pivotally attached to a base frame and having a handle and a hand grip pivotally attached to the handle, a housing is secured to the base frame and includes a chamber to slidably receive a shank which has one end pivotally attached to the back support. An adjustably anchoring device may be used to adjustably anchor the shank to the housing, and to adjustably secure the back support to the base frame to selected angular position. One or more coil springs are engaged onto the shank, and have an inner diameter smaller than an outer diameter of the shank, to allow the springs to be engaged and clamped onto the shank, and to be expanded and released from the shank by a barrel.

13 Claims, 6 Drawing Sheets

WHEEL CHAIR HAVING FOLDABLE BACK SUPPORT

BACKGROUND OF THE INVENTION

1. Field of the Invention

The present invention relates to a wheel chair, and more particularly to a wheel chair having a foldable back support rotatable or adjustable relative to a supporting base frame of the wheel chair to various angular positions.

2. Description of the Prior Art

Typical wheel chairs comprise a supporting base frame for supporting users thereon, and a pair of handles attached to a back support of the base frame, for moving or operating the wheel chair. Normally, the back support is solidly extended from or formed integral with the base frame and thus may not be adjusted relative to the base frame to different angular positions.

For example, U.S. Pat. No. 5,199,520 to Chen discloses one of the typical wheel chairs including a back support solidly secured to or formed integral with the base frame, such that the back support may not be adjusted relative to the base frame to different angular positions.

U.S. Pat. No. 4,339,013 to Weigt discloses another typical wheel chair including a back support foldably secured or attached to a base frame together with a padded support. However, the back support may only be folded relative to the base frame to either a seating position that is perpendicular to a seat, or a laying position that is parallel to the seat, such that the back support also may not be adjusted relative to the base frame to different angular positions.

U.S. Pat. No. 5,560,636 to Chen discloses a further typical wheel chair including a rotatable seat portion and back support and foot support that may be folded or rotated to a substantially vertical position, for helping patients to stand up. However, similarly, the back support also may not be adjusted relative to the base frame to different angular positions.

The present invention has arisen to mitigate and/or obviate the afore-described disadvantages of the conventional wheel chairs.

SUMMARY OF THE INVENTION

The primary objective of the present invention is to provide a wheel chair including a foldable back support rotatable or adjustable relative to a supporting base frame of the wheel chair to various angular positions.

In accordance with one aspect of the invention, there is provided a wheel chair comprising a supporting base frame includes at least one wheel attached thereto, and includes a seat provided thereon for supporting users thereon, and includes a back support pivotally attached to the base frame with a pivot axle, to allow the back support to be rotated and adjusted relative to the base frame to selected angular position, the back support includes a handle extended therefrom, and a hand grip pivotally attached to the handle, a housing is secured to the base frame and includes a hollow chamber formed therein, a shank is slidably received in the chamber of the housing, and includes a first end pivotally attached to the back support with a pivot pin, to allow the shank to be pivoted relative to the back support, and an adjustably anchoring device may be provided for adjustably anchoring the shank to the housing, and to adjustably secure the back support to the base frame to selected angular position, such that the users may be comfortably supported or seated on the wheel chair.

The adjustably anchoring device includes a coil spring member engaged onto the shank, and having an inner diameter smaller than an outer diameter of the shank, to allow the spring member to be engaged and clamped onto the shank.

The adjustably anchoring device includes a barrel received in the housing and having a flap extended therefrom, and having an anchor portion provided therein, the spring member includes a first end attached to the barrel, to allow the spring member to be expanded and released from the shank by the barrel when the barrel is rotated relative to the shank.

A cable is coupled between the hand grip and the flap, to allow the flap and thus the barrel to be rotated relative to the shank against the spring member by the hand grip. The flap includes a hook extended therefrom and having a slot formed therein to slidably receive the cable, and a block is secured to the cable and engaged with the flap and anchored to the flap with the hook, to allow the barrel to be rotated relative to the shank against the spring member by the hand grip via the cable.

The housing includes an extension extended outwardly therefrom and having an aperture formed therein, and an outer covering engaged with the extension of the housing, and the cable is slidably engaged in the outer covering and includes a first end secured to the hand grip, and a second end secured to the block, to allow the barrel to be actuated by the hand grip via the cable and the block.

The housing includes a casing disposed in the hollow chamber thereof, and having a bore and a groove formed therein, and communicating with each other, the flap of the barrel is extended through the groove of the casing. The housing includes an opening formed therein, for receiving the flap of the barrel, and for allowing the flap of the barrel to be extended out of the housing. The housing includes a cover secured thereto, to enclose the opening thereof, and the cover includes a slit formed therein to receive the flap of the barrel.

The housing includes a stop disposed therein and having at least one recess formed therein, and the housing includes at least one protrusion extended inwardly into the hollow chamber thereof, and engaged into the recess of the stop, to anchor the stop in the housing. The housing includes at least one cap attached to one end thereof for enclosing the hollow chamber of the housing, and having an orifice formed therein for slidably receiving the shank. A clamping ring may further be provided and engaged onto the cap, to secure the cap onto the housing.

The shank includes an enlarged head provided on one end thereof and having an outer diameter greater than that of the orifice of the cap, for preventing the enlarged head of the shank from being engaged into the housing. The shank includes a first end secured to a bracket, and the bracket is pivotally attached to the back support with the pivot pin.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
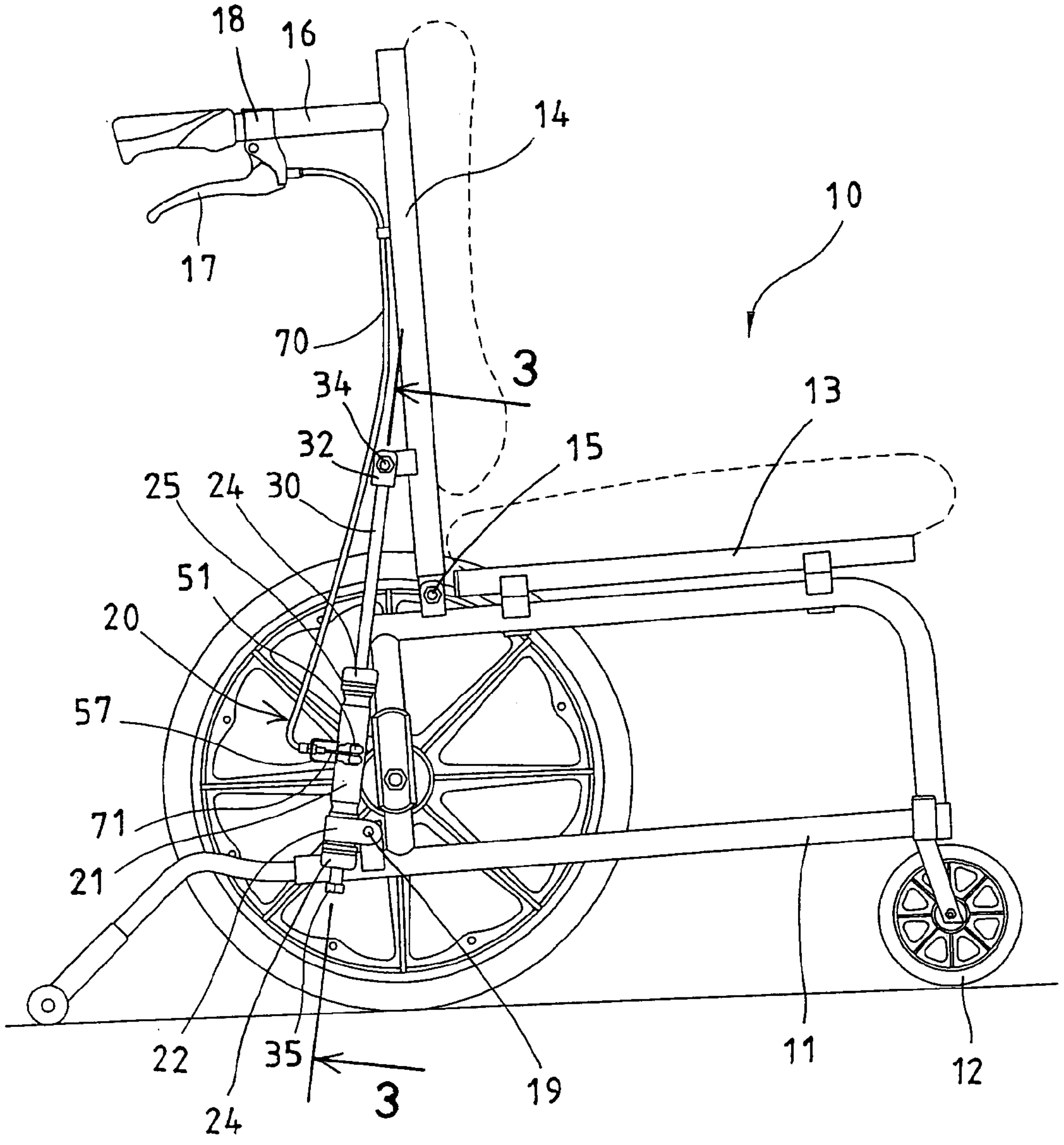
FIG. 1 is a side view of a wheel chair in accordance with the present invention.

Referring to the drawings, and initially to FIGS. 1 and 5–7, a wheel chair 10 in accordance with the present invention comprises a supporting base frame 11 including one or more wheels 12 attached thereto for allowing the supporting base frame 11 to be moved everywhere, and including a seat 13 provided thereon for supporting users thereon, and including a back support 14 pivotally or rotatably attached to the base frame 11 with a pivot axle 15, for allowing the back support 14 to be rotated or adjusted relative to the base frame 11 to any selected angular position.

The back support 14 includes one or more, such as two handles 16 attached to or extended from the back support 14 of the base frame 11, for moving or operating the wheel chair 10 elsewhere.

The back support 14 includes one or more handles 16, such as two handles 16 attached to or extended from the back support 14 of the base frame 11, for moving or operating the wheel chair 10 elsewhere. The back support 14 further includes one or more hand grips 17 pivotally or rotatably attached thereto, or pivotally attached one or both of the handles 16 with brackets 18, for actuating or operating an adjusting device 20, which will be described in further details hereinafter.

The adjusting device 20 includes a housing 21, such as a tubular housing 21 having a bracket 22 attached thereto, such as attached to a lower portion thereof, for securing to the base frame 11 with such as fasteners 19, and having a hollow chamber 23 formed therein for slidably receiving a shank 30 therein. It is preferable that two caps 24 are attached onto the ends of the housing 21, and secured onto the housing 21 with such as clamping rings 25, for enclosing the hollow chamber 23 of the housing 21, and each of the caps 24 includes an orifice 26 formed therein for slidably receiving the shank 30, and thus for allowing the shank 30 to be extended out of the housing 21.

The shank 30 includes one end 31, such as a threaded end 31 secured to a U-shaped bracket 32 with such as fasteners 33, and the bracket 32 is then pivotally or rotatably attached to the back support 14 with a pivot pin 34, to allow the shank 30 to be pivoted or rotated relative to the back support 14. The shank 30 includes an enlarged head 35 formed or provided on the other end thereof and having an outer diameter greater than that of the orifice 26 of the cap 24, for preventing the enlarged head 35 of the shank 30 from being engaged into the housing 21.

Figure 2:
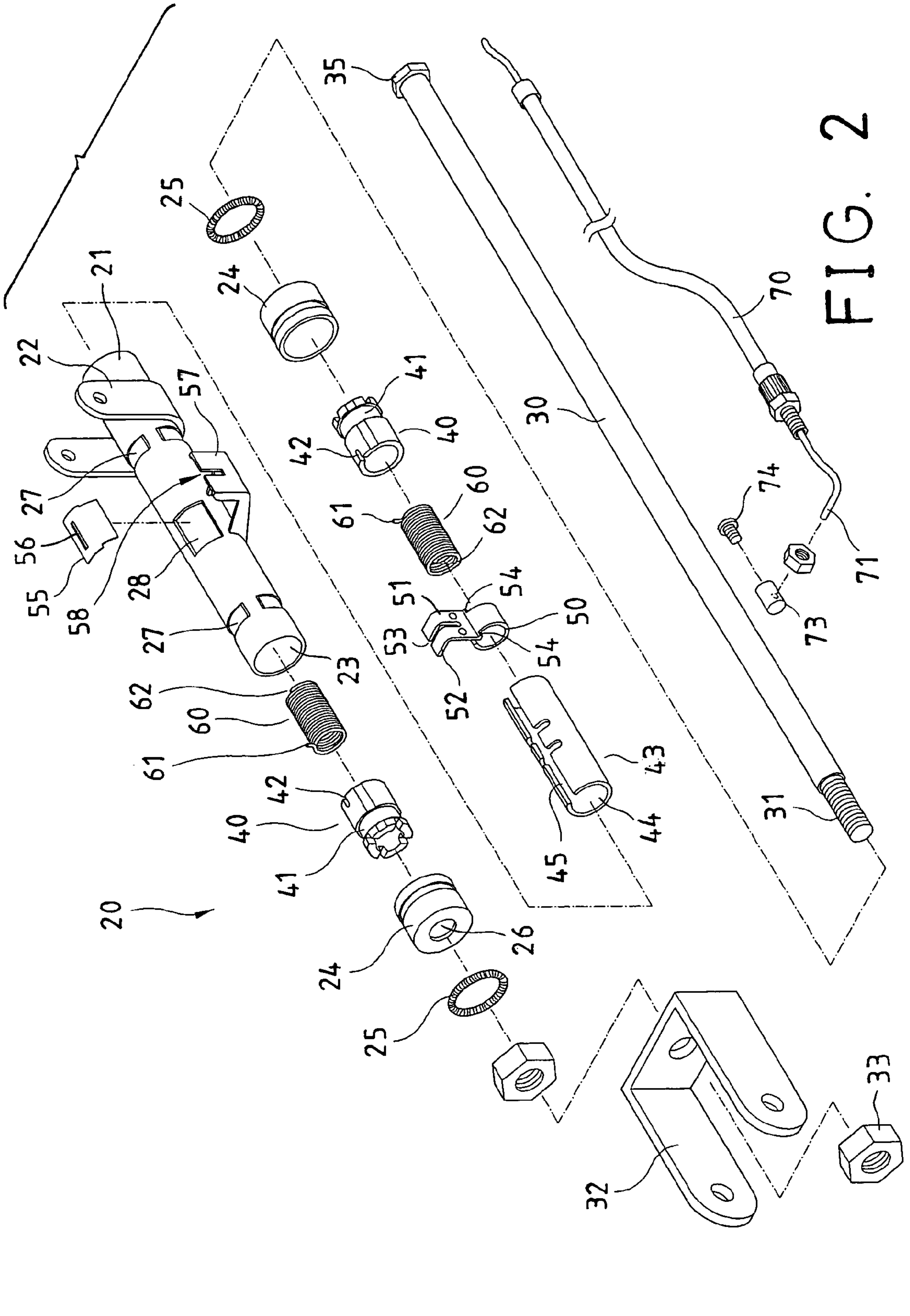
FIG. 2 is a partial exploded view of an adjusting device for a back support of the wheel chair.
Figure 3:
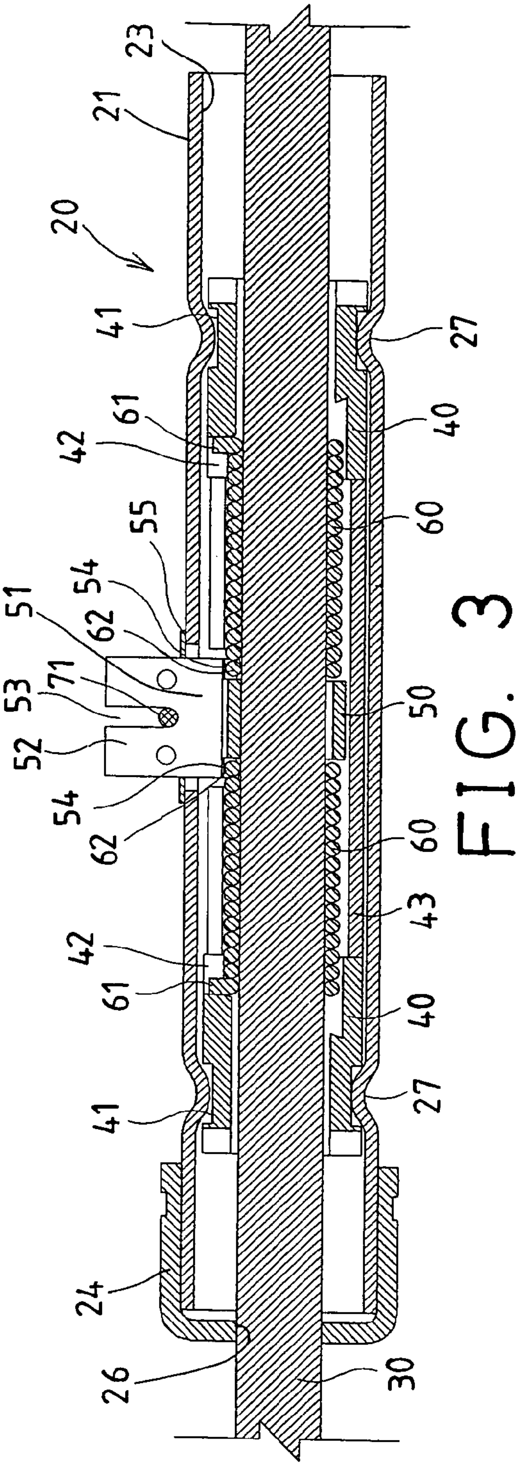
FIG. 3 is a partial cross sectional view of the wheel chair, taken along lines 3—3 of FIG. 1.
Figure 4:
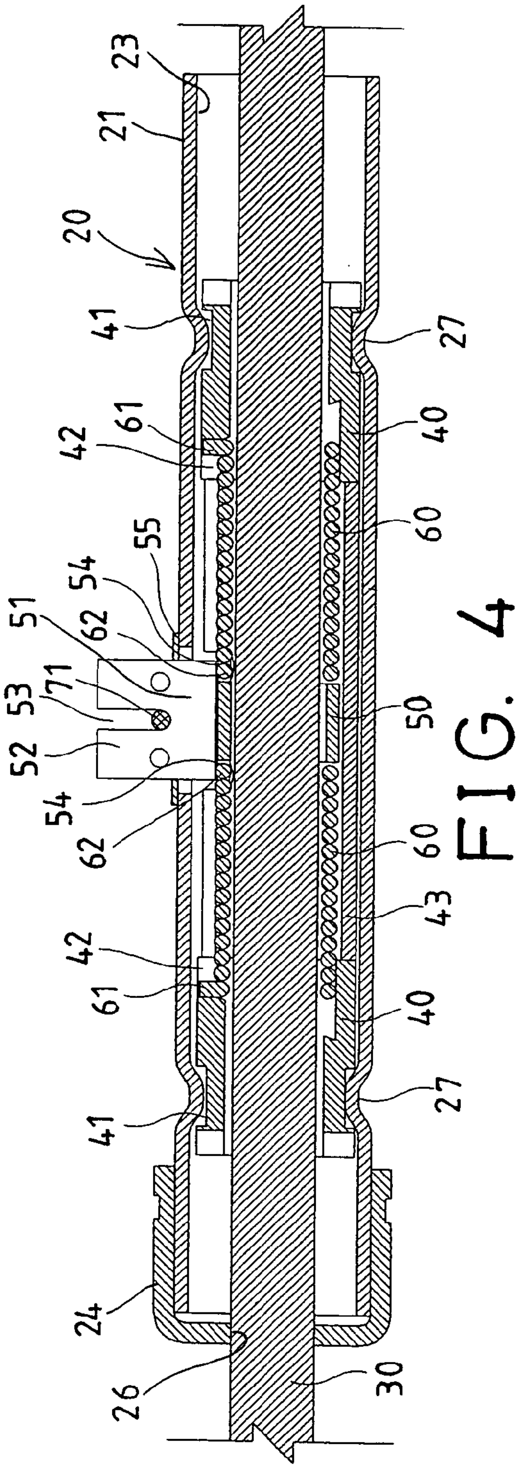
FIG. 4 is a partial cross sectional view similar to FIG. 3, illustrating the operation of the wheel chair.

As shown in FIGS. 2–4, two stops 40 are disposed or engaged into the hollow chamber 23 of the housing 21, and spaced away from each other, and each includes a peripheral recess 41 or one or more recesses 41 formed therein, and each includes a notch 42 formed therein. The housing 21 includes one or more protrusions 27 extended inwardly into the hollow chamber 23 thereof, and engaged into the recesses 41 of the stops 40 respectively, to position and to anchor or secure the stops 40 in the housing 21, and to prevent the stops 40 from being moved axially along and from being rotated relative to the housing 21.

A tubular casing 43 is also disposed or engaged into the hollow chamber 23 of the housing 21, and disposed or anchored between the stops 40, such that the casing 43 may also be prevented from being moved axially along the housing 21. The casing 43 includes a bore 44 and a longitudinal groove 45 formed therein, and communicating with each other.

A barrel 50 is slidably received in the bore 44 of the casing 43, and thus also received in the hollow chamber 23 of the housing 21, and slidably engaged onto the shank 30, and includes a flap 51 extended therefrom, and extended out through the longitudinal groove 45 of the casing 43, and includes a bent segment or a hook 52 extended from the flap 51, and includes a slot 53 formed in the flap 51 and/or the hook 52, and includes two anchor portions 54 formed or provided on the ends of the barrel 50 respectively.

One or more, such as two spring members 60 are also received in the bore 44 of the casing 43, and disposed or engaged between the barrel 50 and the stops 40 respectively, and each includes one end 61 engaged into the notches 42 of the stops 40 respectively, and preferably secured or anchored to the stops 40 respectively, and each includes another end 62 engaged with the anchor portions 54 of the barrel 50 respectively, and preferably secured or anchored to the barrel 50, for allowing the spring members 60 to apply a spring biasing force against the barrel 50.

As shown in FIG. 2, the housing 21 includes an opening 28 formed in an intermediate portion thereof, for receiving the flap 51 and/or the hook 52 of the barrel 50, and for allowing the flap 51 and/or the hook 52 of the barrel 50 to be extended out of the housing 21. It is preferably that a cover 55 is detachably secured to the housing 21, to selectively enclose or block the opening 28 of the housing 21, and includes a slit 56 formed therein to receive the flap 51 and/or the hook 52 of the barrel 50, and to allow the flap 51 and/or the hook 52 of the barrel 50 to be extended out through the cover 55 of the housing 21.

The housing 21 further includes an extension 57 extended outwardly therefrom and having an aperture 58 formed therein. An outer sheath or covering 70 is engaged or attached between the extension 57 of the housing 21 and the bracket 18 of the handle 16, and an operating cable 71 is slidably received or engaged in the outer covering 70, and includes one end secured to one of the hand grips 17, and the other end secured to a block 73 with such as fasteners 74, for allowing the cable 71 and the block 73 to be caused or forced to slide along or relative to the outer covering 70 by the hand grip 17.

The cable 71 is slidably engaged through the aperture 58 of the extension 57 of the housing 21, and also engaged through the slot 53 of the flap 51 and/or of the hook 52, and the block 73 is engaged with the flap 51 and/or of the hook 52 and secured or anchored to the flap 51 with the hook 52, to allow the flap 51 and the barrel 50 to be pulled or forced to rotate relative to the housing 21, against the spring members 60 by the hand grip 17 via the cable 71.

As best shown in FIGS. 2 and 3, the spring members 60 are coil spring members 60 and engaged onto the shank 30, and preferably include an inner diameter slightly smaller than an outer diameter of the shank 30, to allow the spring members 60 to be engaged and clamped onto the shank 30, and such that the spring members 60 may be used as a positioning or anchoring device to adjustably secure or anchor the shank 30 to the housing 21.

As shown in FIG. 4, when the hand grip 17 is forced or grasped to rotate relative to the handle 16 or the back support 14, the flap 51 and the barrel 50 may be pulled or forced to rotate relative to the housing 21 against the spring members 60 by the hand grip 17 via the cable 71, and the spring members 60 may thus be unwound to be slightly expanded or to have an increased inner diameter, and thus to have the shank 30 released from the spring members 60, and thus to allow the shank 30 to slide relative to the housing 21.

Figure 5:
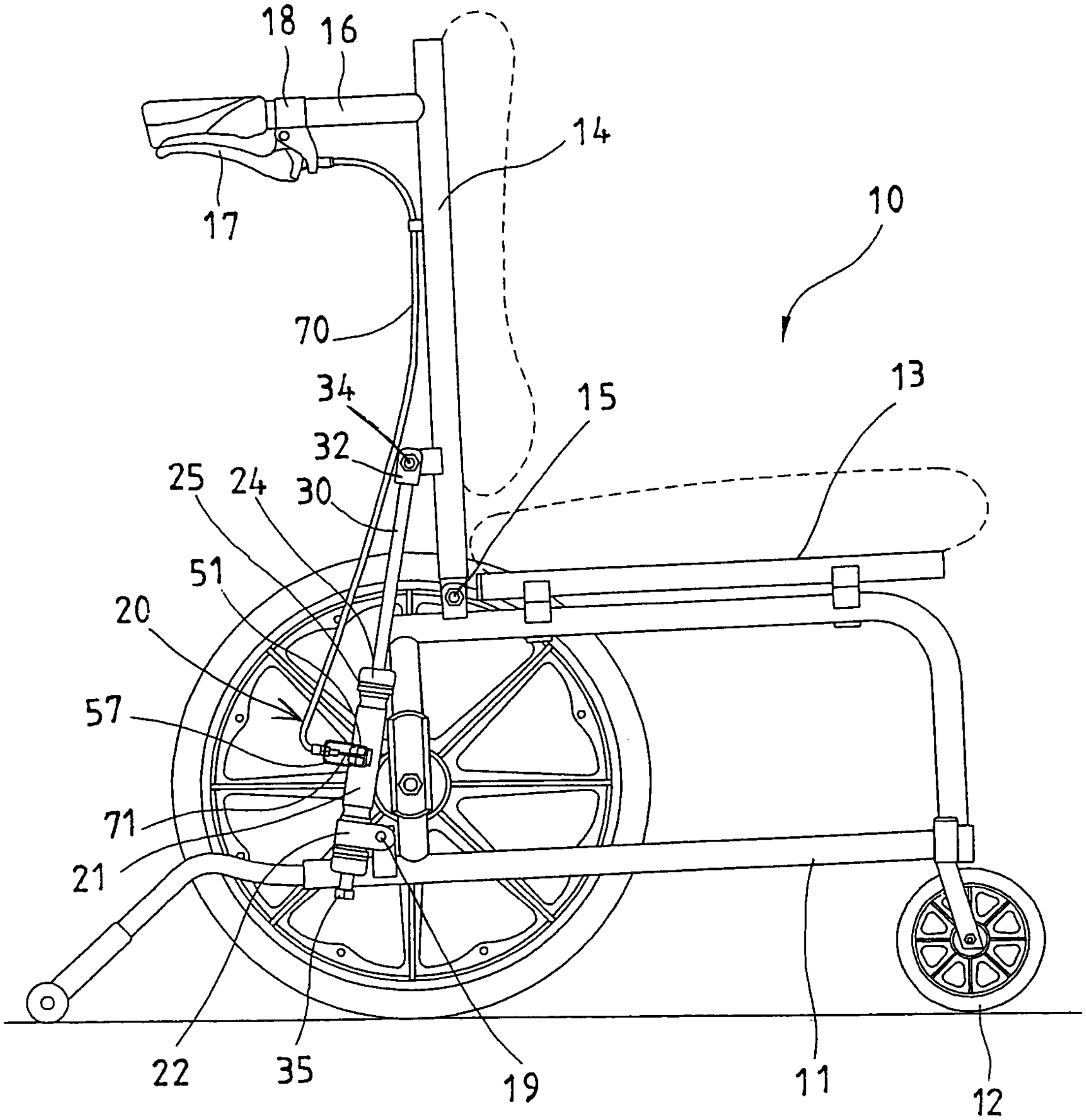
FIGS. 5, 6, 7 are side views illustrating the operation of the wheel chair.
Figure 6:
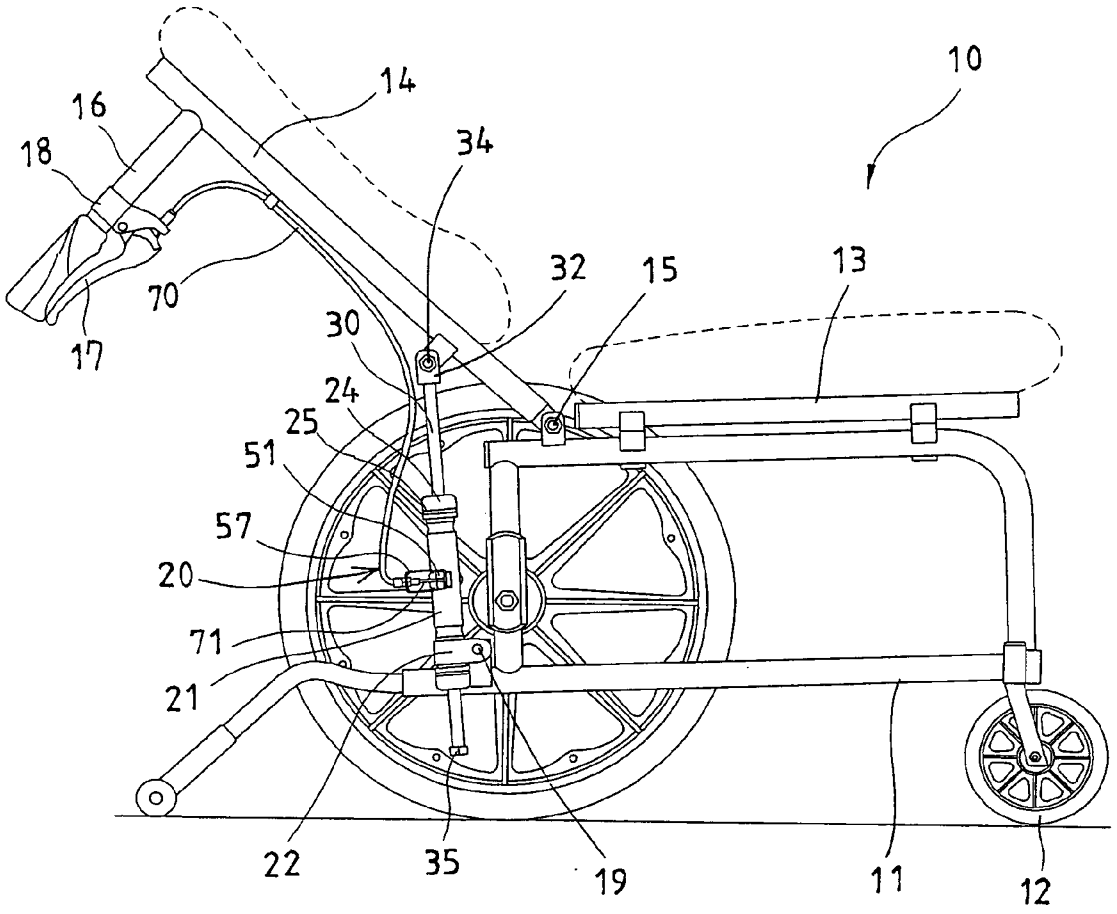
Figure 7:
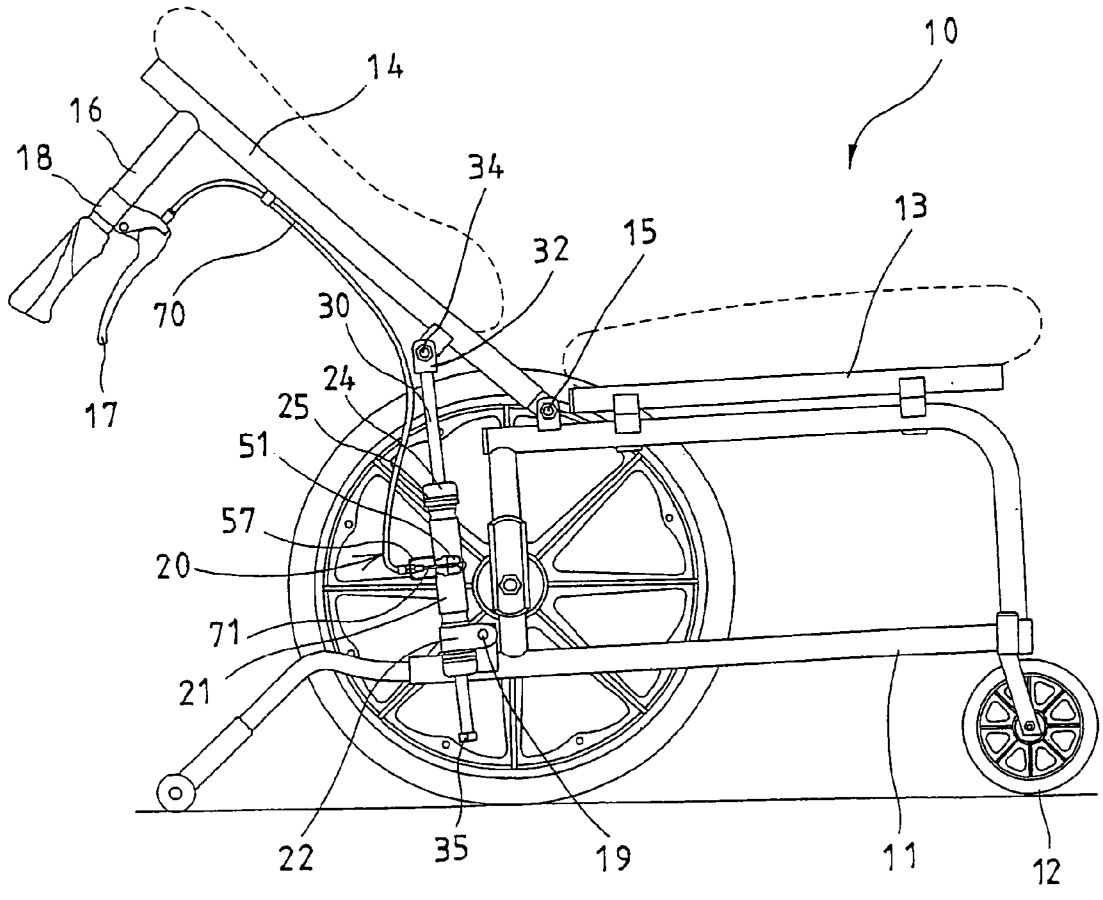

In operation, as shown in FIGS. 4 and 5, when the hand grip 17 is grasped to rotate relative to the handle 16 by the users, the shank 30 may be released from the housing 21 by the spring members 60, such that the shank 30 may slide relative to the housing 21, and such that the back support 14 may be rotated or adjusted relative to the base frame 11 to any selected angular position at this moment (FIG. 6). When the hand grip 17 is released by the users (FIG. 7), the spring members 60 may be released by the barrel 50 and the flap 51, and may be engaged onto and secured onto the shank 30 again, in order to secure the shank 30 to the housing 21 again.

It is to be noted that the shank 30 may slide and adjust relative to the housing 21 to any suitable or selected position, and thus to allow the back support 14 to be rotated or adjusted relative to the base frame 11 to any selected angular position.

Accordingly, the wheel chair in accordance with the present invention includes a foldable back support rotatable or adjustable relative to a supporting base frame of the wheel chair to various angular positions.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A wheel chair comprising:

a supporting base frame including at least one wheel attached thereto, and including a seat provided thereon for supporting users thereon, and including a back support pivotally attached to said base frame with a pivot axle, to allow said back support to be rotated and adjusted relative to said base frame to a selected angular position, said back support including a handle extended therefrom, and a hand grip pivotally attached to said handle, a housing secured to said base frame and having a hollow chamber formed therein, a shank slidably received in said chamber of said housing, and including a first end pivotally attached to said back support with a pivot pin, to allow said shank to be pivoted relative to said back support, and means for adjustably anchoring said shank to said housing, and to adjustably secure said back support to said base frame to selected angular position, said adjustably anchoring means including a coil spring member engaged onto said shank, and having an inner diameter smaller than an outer diameter of said shank, to allow said spring member to be engaged and clamped onto said shank.

2. The wheel chair as claimed in claim 1, wherein said adjustably anchoring means includes a barrel received in said housing and having a flap extended therefrom, and having an anchor portion provided therein, said spring member includes a first end attached to said barrel, to allow said spring member to be expanded and released from said shank by said barrel when said barrel is rotated relative to said shank.

3. The wheel chair as claimed in claim 2, wherein a cable is coupled between said hand grip and said flap, to allow said flap and thus said barrel to be rotated relative to said shank against said spring member by said hand grip.

4. The wheel chair as claimed in claim 3, wherein said flap includes a hook extended therefrom and having a slot formed therein to slidably receive said cable, and a block is secured to said cable and engaged with said flap and anchored to said flap with said hook, to allow said barrel to be rotated relative to said shank against said spring member by said hand grip via said cable.

5. The wheel chair as claimed in claim 4, wherein said housing includes an extension extended outwardly therefrom and having an aperture formed therein, and an outer covering engaged with said extension of said housing, and said cable is slidably engaged in said outer covering and includes a first end secured to said hand grip, and a second end secured to said block.

6. The wheel chair as claimed in claim 2, wherein said housing includes a casing disposed in said hollow chamber thereof, and having a bore and a groove formed therein, and communicating with each other, said flap of said barrel is extended through said groove of said casing.

7. The wheel chair as claimed in claim 2, wherein said housing includes an opening formed therein, for receiving said flap of said barrel, and for allowing said flap of said barrel to be extended out of said housing.

8. The wheel chair as claimed in claim 7, wherein said housing includes a cover secured thereto, to enclose said opening thereof, and said cover includes a slit formed therein to receive said flap of said barrel.

9. The wheel chair as claimed in claim 1, wherein said housing includes a stop disposed therein and having at least one recess formed therein, and said housing includes at least one protrusion extended inwardly into said hollow chamber thereof, and engaged into said at least one recess of said stop, to anchor said stop in said housing.

10. The wheel chair as claimed in claim 1, wherein said shank includes a first end secured to a bracket, and said bracket is pivotally attached to said back support with said pivot pin.

11. A wheel chair comprising:

a supporting base frame including at least one wheel attached thereto, and including a seat provided thereon for supporting users thereon, and including a back support pivotally attached to said base frame with a pivot axle, to allow said back support to be rotated and adjusted relative to said base frame to a selected angular position, said back support including a handle extended therefrom, and a hand grip pivotally attached to said handle, a housing secured to said base frame and having a hollow chamber formed therein, a shank slidably received in said chamber of said housing, and including a first end pivotally attached to said back support with a pivot pin, to allow said shank to be pivoted relative to said back support, and means for adjustably anchoring said shank to said housing, and to adjustably secure said back support to said base frame to selected angular position, and said housing including at least one cap attached to one end thereof for enclosing said hollow chamber of said housing, and having an orifice formed in said at least one cap for slidably receiving said shank.

12. The wheel chair as claimed in claim 11 further comprising a clamping ring engaged onto said at least one cap, to secure said at least one cap onto said housing.

13. The wheel chair as claimed in claim 11, wherein said shank includes an enlarged head provided on one end thereof and having an outer diameter greater than that of said orifice of said at least one cap, for preventing said enlarged head of said shank from being engaged into said housing.

* * * * *